(12) United States Patent
Walker et al.

(10) Patent No.: US 10,082,934 B2
(45) Date of Patent: Sep. 25, 2018

(54) SYSTEMS, METHODS, AND DEVICES FOR REPLACING A CONTACT ENTRY CORRESPONDING TO A COMMUNICATION DEVICE WITH A CONTACT ENTRY CORRESPONDING TO A USER GROUP

(71) Applicant: Sorenson IP Holdings LLC, Salt Lake City, UT (US)

(72) Inventors: Merle L. Walker, Sandy, UT (US); Adam Montero, Midvale, UT (US)

(73) Assignee: Sorenson IP Holdings LLC, Salt Lake City, UT (US)

( * ) Notice: Subject to any disclaimer, the term of this patent is extended or adjusted under 35 U.S.C. 154(b) by 749 days.

(21) Appl. No.: 13/839,384

(22) Filed: Mar. 15, 2013

(65) Prior Publication Data

US 2014/0282041 A1   Sep. 18, 2014

(51) Int. Cl.
| | |
|---|---|
| *G06F 3/0481* | (2013.01) |
| *G06F 3/0482* | (2013.01) |
| *G06F 3/0483* | (2013.01) |
| *G06Q 10/10* | (2012.01) |
| *G06F 3/0484* | (2013.01) |
| *H04M 1/2745* | (2006.01) |
| *H04L 12/58* | (2006.01) |

(52) U.S. Cl.
CPC ............ *G06F 3/0484* (2013.01); *H04L 51/22* (2013.01); *H04M 1/274516* (2013.01)

(58) Field of Classification Search
CPC .... G06F 3/0481; G06F 3/0482; G06F 3/0483; G06F 9/4443; G06F 3/04847
USPC ........................................ 715/810, 764, 739
See application file for complete search history.

(56) References Cited

U.S. PATENT DOCUMENTS

| | | | |
|---|---|---|---|
| 5,619,555 | A | 4/1997 | Fenton et al. |
| 5,815,563 | A | 9/1998 | Ardon et al. |
| 5,923,733 | A | 7/1999 | Binns et al. |
| 5,930,723 | A | 7/1999 | Heiskari et al. |
| 6,018,668 | A | 1/2000 | Schmidt |
| 6,269,369 | B1 * | 7/2001 | Robertson .............. G06Q 10/02 |

(Continued)

FOREIGN PATENT DOCUMENTS

| | | |
|---|---|---|
| EP | 2 104 324 A2 | 9/2009 |
| EP | 2 369 883 A1 | 9/2011 |

(Continued)

OTHER PUBLICATIONS

1NUMBER User Guide THE Z, at http://www.zvrs.com/services/features/1number, at least as early as Feb. 8, 2012.

(Continued)

*Primary Examiner* — Kevin L Young
*Assistant Examiner* — Erik V Stitt
(74) *Attorney, Agent, or Firm* — TraskBritt

(57) ABSTRACT

Apparatuses, systems and methods for presenting a change contact entries option to a user of a first communication device, and causing a contact entry corresponding to the first communication device to be replaced with a contact entry corresponding to a user group to which the first communication device belongs. The first communication device is configured to communicate with one or more servers responsive to being addressed both with a first unique identifier assigned thereto and a first group unique identifier assigned thereto as a member of the user group.

20 Claims, 10 Drawing Sheets

(56) References Cited

U.S. PATENT DOCUMENTS

| | | | |
|---|---|---|---|
| 6,442,251 B1* | 8/2002 | Maes | G06F 3/0488 379/110.01 |
| 6,574,655 B1 | 6/2003 | Libert et al. | |
| 6,628,937 B1* | 9/2003 | Salin | H04M 3/533 379/211.02 |
| 6,714,635 B1* | 3/2004 | Adams | H04M 3/4931 379/204.01 |
| 6,993,355 B1 | 1/2006 | Pershan | |
| 7,050,861 B1 | 5/2006 | Lauzon et al. | |
| 7,187,932 B1* | 3/2007 | Barchi | H04M 1/274516 379/201.01 |
| 7,283,833 B2 | 10/2007 | Fukui et al. | |
| 7,526,306 B2 | 4/2009 | Brems et al. | |
| 7,743,024 B2* | 6/2010 | Mandre | G06Q 10/00 707/620 |
| 7,801,953 B1 | 9/2010 | Denman et al. | |
| 7,853,703 B1 | 12/2010 | McBarron et al. | |
| 8,223,930 B2 | 7/2012 | Narang et al. | |
| 8,289,900 B2 | 10/2012 | DuMas et al. | |
| 8,358,765 B1 | 1/2013 | Whitten et al. | |
| 8,520,807 B1 | 8/2013 | Hewinson | |
| 8,577,895 B2* | 11/2013 | Gupta | H04M 1/274583 707/748 |
| 8,774,801 B2* | 7/2014 | Ore | H04W 60/00 370/338 |
| 9,210,258 B2* | 12/2015 | Strope | H04L 12/66 |
| 9,258,399 B2* | 2/2016 | Kim | H04M 1/274516 |
| 2002/0057783 A1 | 5/2002 | Kredo et al. | |
| 2003/0009592 A1 | 1/2003 | Stahura | |
| 2003/0041138 A1 | 2/2003 | Kampe et al. | |
| 2003/0086554 A1 | 5/2003 | Krimstock et al. | |
| 2003/0093537 A1 | 5/2003 | Tremlett et al. | |
| 2003/0097466 A1 | 5/2003 | Sung | |
| 2003/0125072 A1 | 7/2003 | Dent | |
| 2004/0081136 A1 | 4/2004 | Brown et al. | |
| 2004/0137882 A1 | 7/2004 | Forsyth | |
| 2004/0223598 A1 | 11/2004 | Spiridellis | |
| 2004/0243941 A1* | 12/2004 | Fish | G06Q 10/107 715/752 |
| 2005/0014522 A1* | 1/2005 | Tirabassi | H04M 3/382 455/518 |
| 2005/0075925 A1* | 4/2005 | Sash | G06Q 30/02 705/14.36 |
| 2005/0267876 A1 | 12/2005 | Watanabe et al. | |
| 2006/0053379 A1* | 3/2006 | Henderson | G06F 3/0481 715/751 |
| 2006/0099983 A1 | 5/2006 | Kim | |
| 2006/0230043 A1 | 10/2006 | Sumner-Moore | |
| 2007/0038720 A1* | 2/2007 | Reding | G06Q 10/107 709/217 |
| 2007/0064090 A1* | 3/2007 | Park | H04N 7/147 348/14.01 |
| 2007/0118809 A1* | 5/2007 | Ozugur | H04L 63/102 715/776 |
| 2007/0167141 A1 | 7/2007 | Akiyama | |
| 2007/0232342 A1 | 10/2007 | Larocca | |
| 2007/0280464 A1 | 12/2007 | Hughes et al. | |
| 2008/0002671 A1 | 1/2008 | Nagai | |
| 2008/0037745 A1 | 2/2008 | Ramamoorthy et al. | |
| 2008/0037748 A1 | 2/2008 | Jefferson et al. | |
| 2008/0057926 A1* | 3/2008 | Forstall | G06F 3/0482 455/415 |
| 2008/0064350 A1 | 3/2008 | Winkler | |
| 2008/0119172 A1 | 5/2008 | Rao et al. | |
| 2008/0126362 A1* | 5/2008 | Shoemaker | G06F 17/30575 |
| 2008/0189351 A1 | 8/2008 | Nemoto et al. | |
| 2008/0288494 A1 | 11/2008 | Brogger et al. | |
| 2009/0013380 A1 | 1/2009 | Chandrasiri et al. | |
| 2009/0034696 A1 | 2/2009 | Ramanathan | |
| 2009/0106199 A1 | 4/2009 | Wang | |
| 2009/0157732 A1* | 6/2009 | Hao | H04M 3/53325 |
| 2009/0238356 A1* | 9/2009 | Kojo | H04L 29/12292 379/206.01 |
| 2010/0016007 A1* | 1/2010 | Satake | H04W 4/08 455/518 |
| 2010/0136980 A1* | 6/2010 | Linquist | H04M 15/765 455/445 |
| 2010/0184454 A1 | 7/2010 | Luft et al. | |
| 2010/0202604 A1* | 8/2010 | Siegel | H04M 19/041 379/207.16 |
| 2011/0135077 A1 | 6/2011 | Wengrovitz | |
| 2011/0142221 A1 | 6/2011 | Tofighbakhsh et al. | |
| 2011/0199915 A1 | 8/2011 | Santhanam et al. | |
| 2011/0270880 A1 | 11/2011 | Jesse et al. | |
| 2011/0317684 A1 | 12/2011 | Lazzaro et al. | |
| 2012/0004015 A1* | 1/2012 | Le Thierry D'Ennequin | H04M 1/274516 455/566 |
| 2012/0028618 A1 | 2/2012 | Goel et al. | |
| 2012/0102073 A1 | 4/2012 | Patel | |
| 2012/0220325 A1 | 8/2012 | Zhou et al. | |
| 2012/0257756 A1 | 10/2012 | Huang et al. | |
| 2012/0296756 A1 | 11/2012 | Shah | |
| 2012/0314849 A1 | 12/2012 | LeBlanc et al. | |
| 2013/0010708 A1 | 1/2013 | Abraham et al. | |
| 2013/0012121 A1* | 1/2013 | Chen | H04W 8/005 455/39 |
| 2013/0021957 A1 | 1/2013 | Fang et al. | |
| 2013/0070912 A1 | 3/2013 | Parandekar et al. | |
| 2013/0100870 A1 | 4/2013 | Xie et al. | |
| 2013/0223318 A1 | 8/2013 | Liu et al. | |
| 2014/0148136 A1 | 5/2014 | Thange | |
| 2014/0185609 A1* | 7/2014 | Efrati | H04M 1/274516 370/352 |
| 2014/0267580 A1 | 9/2014 | Parent et al. | |
| 2014/0272814 A1 | 9/2014 | Parent et al. | |
| 2014/0280562 A1 | 9/2014 | Shields | |
| 2014/0282041 A1 | 9/2014 | Walker et al. | |
| 2014/0282095 A1 | 9/2014 | Walters et al. | |
| 2014/0365469 A1* | 12/2014 | Daskal | G06F 17/30598 707/722 |

FOREIGN PATENT DOCUMENTS

| | | |
|---|---|---|
| WO | WO 00/30374 | 5/2000 |
| WO | WO 2005/101757 A1 | 10/2005 |
| WO | WO 2008/124447 A1 | 10/2008 |

OTHER PUBLICATIONS

1NUMBER Quick Start Guide, at http://www.zvrs.com/services/features/1number, at least as early as Feb. 8, 2012.
Z-20 User Guide, at http://www.zvrs.com/products/hardware/z-20/, at least as early as Feb. 7, 2012.
1NUMBER User Guide THE Z.
1NUMBER Quick Start Guide.
Z-20 User Guide.

* cited by examiner

SYSTEMS, METHODS, AND DEVICES FOR REPLACING A CONTACT ENTRY CORRESPONDING TO A COMMUNICATION DEVICE WITH A CONTACT ENTRY CORRESPONDING TO A USER GROUP

CROSS-REFERENCE TO RELATED APPLICATIONS

This application is related to U.S. patent application Ser. No. 13/840,046, entitled "SYSTEMS INCLUDING AND METHODS OF OPERATING COMMUNICATION DEVICES ASSIGNED INDIVIDUAL AND GROUP IDENTITIES," filed on Mar. 15, 2013, U.S. patent application Ser. No. 13/842,401, entitled "COMMUNICATION SYSTEMS AND RELATED METHODS FOR COMMUNICATING WITH DEVICES HAVING A PLURALITY OF UNIQUE IDENTIFIERS," filed on Mar. 15, 2013, U.S. patent application Ser. No. 13/840,659, entitled "A USER INTERFACE FOR CREATING AND ADMINISTERING A USER GROUP AND METHODS OF OPERATING SUCH," filed on Mar. 15, 2013, and U.S. patent application Ser. No. 13/837,619, entitled "COMMUNICATION SYSTEMS AND RELATED METHODS FOR NOTIFYING DEVICES HAVING A PLURALITY OF UNIQUE IDENTIFIERS ABOUT MISSED COMMUNICATIONS," filed on Mar. 15, 2013, the disclosure of each of which is incorporated herein by this reference in its entirety.

FIELD

Embodiments of the present disclosure relate to replacing a contact entry corresponding to a communication device with a contact entry corresponding to a user group in a remote contact list of a communication device. More particularly, the present disclosure relates to updating contact entries in communication devices for the hearing impaired.

BACKGROUND

Video phone communication systems provide visual and audio communication between two or more users during a communication session. A video phone at a first location can transmit and receive audio and video signals to and from a video phone at a second location such that participants at the first location are perceived to be present or face-to-face with participants at a second location and vice versa.

Video phone communication systems span a variety of applications. One contemplated application of a video phone system includes facilitization of a communication session of a hearing-impaired user (e.g., deaf or hard of hearing), because many individuals with significant hearing loss are not able to communicate effectively over conventional telephone systems that rely upon voice communications. The hearing-impaired user may use a video phone during a communication session to relay his or her expressions over the video phone communication system. Such video phone communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS) that may provide an interpretive (i.e., translation) service by providing a hearing-capable translator who relays the expressions of the hearing-impaired caller to a hearing-capable user on the other end of the communication session in a conventional manner, such as through the use of a voice-based dialogue conveyed over a conventional voice phone. The hearing-capable translator may also translate the voice-based dialogue back to the hearing-impaired user into expressions (e.g., American Sign Language (ASL)).

As a consequence of the recent proliferation of communication devices, many people own several communication devices capable of video calls. For example, a single user may have one or more video phones at home, one or more video phones at their place of employment, a smart phone device, a tablet computer, a laptop computer, and/or a personal computer. The user may use some or all of these communication devices for video calls.

Conventionally, each of these communication devices are individually managed and are associated with separate user accounts. As a result, a user of multiple communication devices may be required to keep track of different login credentials for each separate communication device. In addition, each individual communication device may have its own unique identifier (e.g., phone number, IP address, or other similar identifier used by a specific system) that is used to make and receive video calls. As a result, users have the burden of informing others what the unique identifiers are for each individual communication device so that others may contact them. Other people may also be inconvenienced by keeping track of several unique identifiers for the user when dialing a call to or receiving caller identification (caller ID) information from the user's various communication devices.

Also, having a plurality of different communication devices may become burdensome for the user to maintain information among each of their communication devices. For example, if a user desires to block an undesired caller, change device or account settings, access messages, or add new contacts to a directory on one of the communication devices, the action may need to be repeated separately on each of the rest of the communication devices. Furthermore, if a video call is missed on one of the communication devices, the user often only becomes aware the missed call only when the user is again in the proximity of that particular communication device.

BRIEF SUMMARY

Embodiments of the present disclosure include systems, methods, and devices for replacing a contact entry corresponding to a communication device with a contact entry corresponding to a user group that the communication device belongs to.

In some embodiments, the present disclosure comprises a communication device including a user interface configured to present a change contact entries option to a user. The user interface may also be configured to cause a first contact entry corresponding to the communication device stored in a second remote contact list on a second memory device of at least a second communication device to be replaced with a first group contact entry corresponding with a first user group to which the communication device belongs. The communication device is configured to communicate with one or more servers responsive to being addressed both with a first unique identifier assigned thereto and a first group unique identifier assigned thereto as a member of the user group.

In other embodiments, the present disclosure comprises a method of operating a communication system. The method includes causing a change entries option to be presented to a user through a user interface of a first communication device. The first communication device is configured to communicate with one or more servers responsive to being addressed by the one or more servers both with an individual unique identifier assigned thereto and a group unique identifier assigned thereto as a member of a user group. The method also includes replacing a contact entry corresponding to the first communication device with a contact entry corresponding to the user group in a remote contact list stored on a memory device of at least a second communication device responsive to the user selecting the change entries option.

In other embodiments, the present disclosure comprises a communication system including one or more servers. The one or more servers are configured to address a plurality of communication devices with an individual unique identifier assigned to each of the plurality of communication devices. The one or more servers are also configured to address a first communication device of the plurality of communication devices with a group unique identifier assigned to a user group comprising the first communication device. In addition, the one or more servers are configured to automatically cause a contact entry corresponding to the first communication device to be replaced with a contact entry corresponding to the user group in a remote contact list stored on a memory device of at least a second communication device responsive to a first user of the first communication device changing the contact entry corresponding to the first communication device with the first communication device.

DETAILED DESCRIPTION

Figure 1:
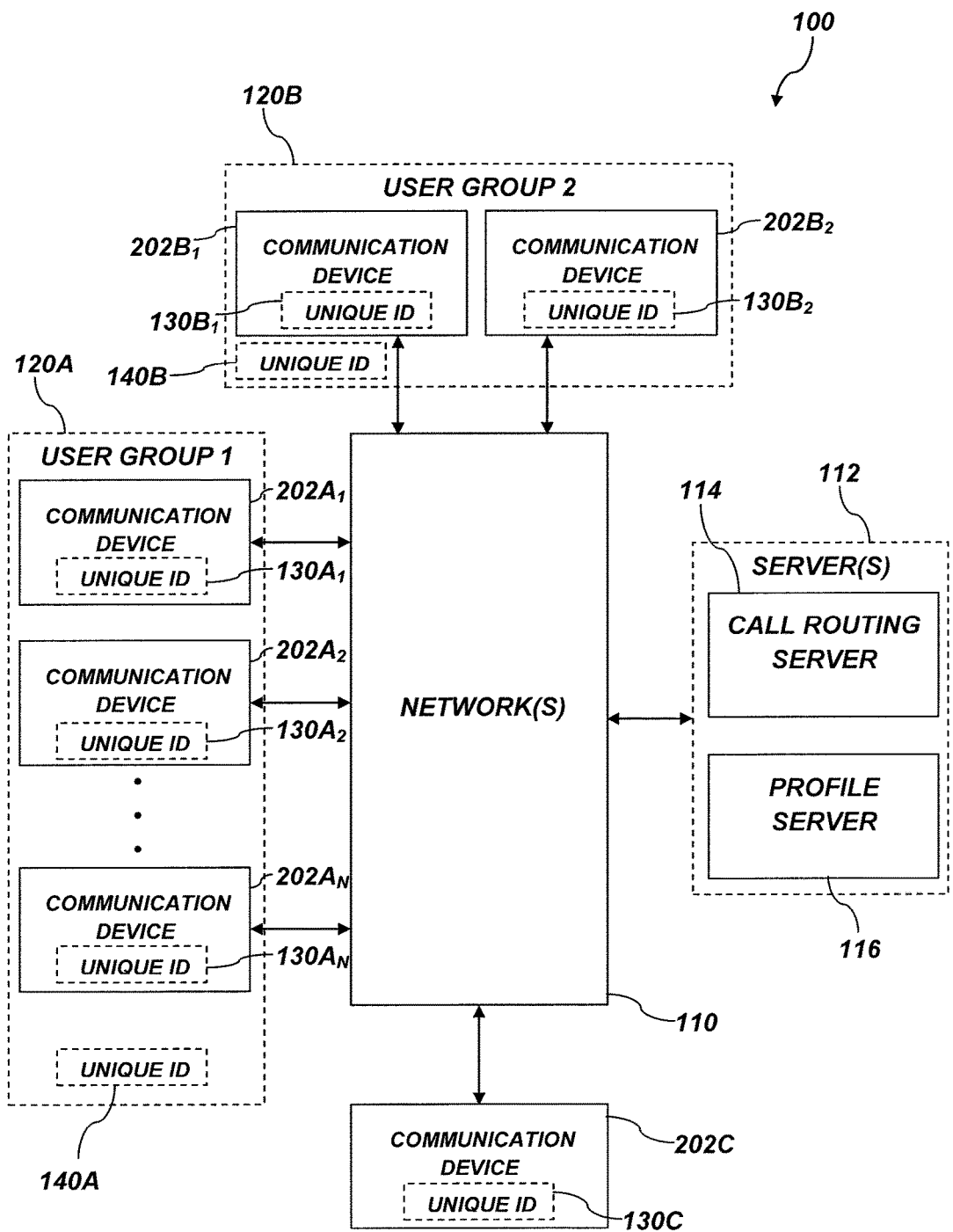
FIG. 1 is a simplified block diagram of a communication system according to an embodiment of the present disclosure.

In the following detailed description, reference is made to the accompanying drawings that form a part hereof, and in which is shown by way of illustration, specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular method, device, or system, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

Embodiments of the present disclosure include systems, methods, and devices for replacing a contact entry corresponding to a communication device with a contact entry corresponding to a user group in a remote contact list of another communication device. As discussed above, video communication systems span a variety of applications. Embodiments of the present disclosure are generally described herein with reference to a video communication system for use by hearing-impaired users. Such video communication systems may facilitate communication sessions between different hearing-impaired users (e.g., video phone to video phone communication), or between a hearing-impaired user and a hearing-capable user (e.g., video phone to voice phone communication), which may be assisted through a video relay service (VRS). It should be noted, however, that embodiments of the present disclosure may include any application or environment where replacing a contact entry corresponding to a communication device with a contact entry corresponding to a user group may be helpful or desirable. For example, it is contemplated that embodiments of the present disclosure may include video communication session between hearing-capable users.

The term "call" refers to a communication with a communication device that may be routed through a number of networks, such as, for example, a private network, the internet, a telephone system, and a VRS. The term "incoming call" refers to an incoming communication to a communication device.

The term "communication device" may refer to a specific compilation of hardware components, software components, or a combination thereof. The term "communication device" may also refer to a software based communication device that exists on a device configured to execute machine-readable commands, such as, for example a computer. As software, it should be understood that the same communication device may exist on a first device while a user accesses the communication device on the first device, and on a second device at a different time while the user accesses the communication device on the second device.

FIG. 1 is a simplified block diagram of a communication system 100 according to an embodiment of the present disclosure. The communication system 100 may include a plurality of communication devices $202A_1$, $202A_2$, . . . $202A_N$, $202B_1$, $B_2$, $202C$ (which are collectively referred to as communication devices 202). In some instances, reference may be made to an individual communication device by the generic designation of reference numeral 202. The communication system 100 may further include one or more servers 112, with which the communication devices 202 communicate through one or more networks 110. In other words, the communication devices 202 may be configured to establish communication with the one or more servers 112 (also referred to simply as "servers" 112) through the one or more networks 110 (also referred to simply as "networks" 110). The communication devices 202 may be configured to communicate with each other over a video call with the assistance of the servers 112 as described more fully below.

Each of the communication devices 202 may be assigned an individual unique identifier 130. In some instances, reference may be made to an individual unique identifier by the general designation of reference numeral 130. For example, communication devices $202A_1$, $202A_2$, . . . $202A_N$ may respectively be assigned an individual unique identifier $130A_1$, $130A_2$, . . . $130A_N$. In addition, the communication devices $202B_1$, $202B_2$ may respectively be assigned an individual unique identifier $130B_1$, $130B_2$. The communication device 202C may be assigned an individual unique identifier 130C. The individual unique identifier 130 is, therefore, device-centric rather than user-centric or location-centric. In other words, an individual unique identifier 130 may be associated with an individual communication device 202. In general, individual unique identifiers 130 are not shared by multiple communication devices 202. In some respects, an individual unique identifier 130 may be similar to a telephone number. For example, the individual unique identifier 130 may be used by other people to initiate video calls with the user of the communication device 202 associated with the individual unique identifier 130. In other respects, the individual unique identifier 130 may be similar to an IP address. For example, the individual unique identifier 130 may be used to identify the communication devices 202 to the servers 112. The individual unique identifier 130 may have a numerical format, such as an IP address or a phone number (e.g., a seven digit number, a ten digit number including an area code, etc.). The individual unique identifier 130 may have an alphabetic format (e.g., a word, a phrase, etc.), an alphanumerical format, or other suitable format used to uniquely identify an individual communication device 202. As another non-limiting example, the individual unique identifier 130 may be a Media Access Control (MAC) address, which uniquely identifies a network interface of the communication device 202.

The communication devices 202 may also be associated with one or more user groups 120A, 120B (which are collectively referred to as user groups 120). In some instances, reference may be made to an individual user group by the generic designation of reference numeral 120. A user group 120 may be may be an association (i.e., grouping) of communication devices 202 that are defined as members of the user group 120, as desired by a user. A user group 120 may be associated with any number of communication devices 202 so long as there are at least two communication devices 202 grouped together by the user. By way of non-limiting example, communication devices $202A_1$, $202A_2$, . . . $202A_N$ may be associated with a first user group 120A. The first user group 120A may be associated with a first user. Other communication devices $202B_1$, $202B_2$ may be associated with a second user group 120B. The second user group 120B may be associated with a second user. The communication system 100 may include communication devices 202, such as communication device 202C, which may not be associated with any user group.

The user groups 120A, 120B may respectively be assigned group unique identifiers 140A, 140B (which are collectively referred to as group unique identifiers 140). The group unique identifiers 140 are unique to a group rather than to an individual communication device 202. In other words, the group unique identifiers 140 are group-centric, such that the group unique identifiers 140 are not shared by other user groups 120. Therefore, individual communication devices 202 may be associated with both an individual unique identifier 130 and a group unique identifier 140. For example, a first communication device $202A_1$ may be associated with the individual unique identifier $130A_1$ and the group unique identifier 140A. Likewise, a second communication device 202A2 may be associated with the individual unique identifier $130A_2$ and the group unique identifier 140A. Thus, because the first communication device $202A_1$ and the second communication device $202A_2$ are part of the same user group 120A, the first communication device $202A_1$ and the second communication device $202A_2$ share the same group unique identifier 140A (but not individual unique identifiers $130A_1$, $130A_2$). Other user groups (e.g., user group 120B) may be similarly configured.

A call may be initiated to the communication devices 202 by being addressed by either its individual unique identifier 130 or its group unique identifier 140. For example, if a person (e.g., the second user) calls the first user by entering the individual unique identifier $130A_1$, only the individual communication device $202A_1$ may indicate an incoming call. If, however, a person calls the first user by entering the group unique identifier 140A assigned to the first user group 120A, each of the communication devices $202A_1$, $202A_2$, . . . $202A_N$ of the first user group 120A may indicate an incoming call. An incoming call may be indicated visually, tactilely, audibly, or some other suitable indication, and combinations thereof. For hearing-impaired users, an incoming call may be indicated visually, tactilely, and combinations thereof.

As discussed above, the communication devices 202 may be associated with a user group 120 as desired by the user. In other words, the reasons for grouping the communication devices 202 within a particular user group 120 may be determined by the user acting as a group organizer, rather than any particular limitation. For example, each communication device 202 belonging to a user group 120 need not be located in close proximity to each other. By way of non-limiting example, a single user group 120 may include a communication device 202 stationed at a user's dwelling, a communication device 202 at the user's place of employment, a communication device 202 at the user's cabin, and a portable communication device 202 that may be carried anywhere. It should also be understood that two or more communication devices 202 from the same user group 120 may be located proximate to each other. By way of non-limiting example, two or more communication devices 202 from the same user group 120 may be stationed in various locations of the user's home, such as in the living room, the kitchen, the bedroom, etc.

In addition, the communication devices 202 associated with a single user group 120 may belong to two or more users. By way of non-limiting example, communication devices 202 belonging to friends, family members, co-workers, and/or roommates may be part of a single user group 120. As a result, the user acting as the group organizer may invite others to join one or more of their communication devices 202 to join his group.

A single user group 120 may also include several different types of communication devices 202. By way of non-limiting example, an individual user group 120 may include any one or more of a personal computer, a smart phone, a tablet computer, and a video phone. In addition, a single user group 120 may include multiple communication devices from the same device type. For example, an individual user group 120 may have a plurality of video phones within the same individual user group 120. Furthermore, a single user group 120 may include any number of communication devices 202, limited only by the capacity of the communication system 100, and/or a desire to limit services to user groups 120 of a predetermined number of communication devices 202. By way of non-limiting example, administrators of a communication system 100 may choose to limit the number of communication devices 202 that a group organizer may be allowed to include within single user group 120 to a maximum number (e.g., five, six, etc.) of allowed communication devices 202.

The communication devices 202 may be configured to enable a user to participate in video calls with the other communication devices 202 of the communication system 100. A "video call" refers to communications where real-time or quasi real-time video data is exchanged between at least two parties. A video call may also refer to an attempted initiation of a real-time or quasi real-time video data exchange. For example, a first user using a first communication device $202A_1$ may communicate with one or more other users using any of the other communication devices $202A_2$, . . . $202A_N$ associated with the first user group 120A, the communication devices $202B_1$, $202B_2$ associated with the second user group 120B, another communication device 202C not associated with a user group 120, and combinations thereof.

Any one of a variety of communication devices 202 may be configured to place and receive video calls, in part, because advancements in communication device technology have substantially increased the quantity, variety, and affordability of communication devices. By way of non-limiting example, the communication devices 202 may include any of a video phone, a desktop computer, a laptop computer, a tablet computer, a smart phone, and other suitable devices. Examples of a video phone include the NTOUCH® VP video phone and the VP-200 video phone available from SORENSON COMMUNICATIONS® of Salt Lake City, Utah. More device-level detail on the communication devices 202 is discussed below with reference to FIG. 2.

The networks 110 may include an internet protocol network configured to transmit communications between each of the plurality of communication devices 202 and the servers 112, such as by using an internet protocol (IP). The networks 110 may include a wide area network (WAN), a local area network (LAN), a personal area network (PAN), and combinations thereof. In some embodiments, the servers 112 may be part of a cloud network. The networks 110 may be configured to communicate with the plurality of communication devices 202 and the servers 112 wirelessly, through a cable, and combinations thereof. Some non-limiting examples of suitable wireless communications may include "wifi," Bluetooth, and mobile wireless networks. Some non-limiting examples of suitable cables include fiber-optic cables, coaxial cables, traditional telephone cables, and Ethernet cables.

The servers 112 may be configured to provide services to the communication devices 202. For example, the servers 112 may be configured to manage calling functions, such as video call sessions and messages for the communication devices 202 of the communication system 100. In addition, the servers 112 may store and manage account information for the communication devices 202. Account information may include address books, account billings, and other information corresponding to the communication device 202 associated with the individual unique identifier 130. As non-limiting examples, the servers 112 may include a call routing server 114 and a profile server 116. Although discussed herein separately, the call routing server 114 and the profile server 116 may optionally be implemented as a single server device. Likewise, both the call routing server 114 and the profile server 116 may optionally include multiple server devices, and the various functions of the call routing server 114 and the profile server 116 may not necessarily be isolated to separate devices.

The call routing server 114 may be configured to set up and control a video call between one or more of the plurality of communication devices 202 and another of the plurality of communication devices 202, or a communication device associated with another user (not shown). The call routing server 114 may be configured to establish and control the video call through, for example, a session initiation protocol (SIP), or other suitable protocol.

The call routing server 114 may also periodically receive communications from each of the plurality of communication devices 202, including location or contact information, so that the call routing server 114 may locate and setup video call sessions with the communication devices 202 as needed. Also, the call routing server 114 may cause a particular communication device 202 to indicate an incoming call responsive to another person entering the individual unique identifier 130 assigned to the particular communication device 202. Furthermore, when the user enters the individual unique identifier 130 associated with another communication device 202 from one of the plurality of communication devices 202, the call routing server 114 may arrange for an outgoing call to be sent to the communication device 202 with the entered individual unique identifier 130 assigned thereto. In addition, when the user enters the group unique identifier 140 associated with a user group 120, the call routing server 114 may arrange for an outgoing call to be sent to each of the communication devices 202 associated with the entered group unique identifier 140 assigned thereto.

The profile server 116 may be configured to manage one or more user accounts associated with the individual unique identifiers 130. In some embodiments, the profile server 116 may also be configured to store information associated with each user account within the communication system 100. By way of non-limiting example, the profile server 116 may be configured to store an address book, a blocked caller list, a message history, text messages, video messages, a call history, personal user information, and combinations thereof, associated with each user account. In other embodiments, each of the communication devices 202 may be configured to store the information associated with the user account corresponding to the individual unique identifier 130 assigned thereto.

The servers 112 may be configured to enable the communication devices 202 to be associated with a user group 120. The user group 120 may, in some respects, function similarly to a separate communication device 102. For example, the user group 120 may be assigned a group unique identifier 140 and be associated with corresponding group account and group information, such as a group blocked caller list, a group message history, group text messages, group video messages, a group call history, a group address book (i.e., contact list), and combinations thereof, which may be stored on the profile server 116. Accessing any communication device 202 in the user group 120 may enable the user to access the group information, and communicate through the networks 110 using the group unique identifier 140 assigned to the user group 120. In some embodiments, group information may simply be a matter of the servers 112 being able to access individual communication device information that is stored for each communication device 202 to be shared with other communication devices 202 of the user group 120.

In some embodiments, where activity performed on a second communication device $202A_2$ causes changes to the group information, the profile server 116 may communicate the changes in group information to the rest of the plurality of communication devices 202 belonging to the user group 120. Each of the plurality of communication devices 202 may be configured to periodically enter communication with the profile server 116 to receive updates. By way of non-limiting example, each of the plurality of communication devices 202 may be configured to enter communication with the profile server 116 approximately every five minutes (or other periodic interval) to receive updates. In some embodiments, updates may be event-driven such that certain events may cause the profile server 116 to broadcast updates to one or more of the communication devices 202. Initiation of these information updates and synchronizations may be performed by the servers 112 or the communication devices 202.

In some embodiments, the communication device 202 that is the creator of the user group 120 may have its information (e.g., lists) serve as the basis for the shared group information (e.g., shared lists). As discussed above, shared lists may include a blocked caller list, a group message history, group text messages, group video messages, a group call history, a group address book (i.e., contact list). As a result, each of these group lists may be shared and accessible (for viewing, editing, adding to, etc.) by each communication device 202. If a shared group list is changed, the change may be saved within the profile server 116. In addition, the profile server 116 may broadcast a notification to each of the communication devices 202 within the user group 120 that a change has been made to the shared group lists and that their local cache needs to be updated. The individual communication devices 202 may respond (e.g., either immediately or at their next scheduled interval) to receive the updated information to store in their local cache. In addition, there may be shared settings among group members that may be edited and shared in a similar manner. For example, shared settings may include the number of rings that occur before going to voice mail, a common voice mail message that is applied to all communication devices 202 rather than each communication device 202 having its own, among other similar settings.

In some embodiments, the profile server 116 and/or the individual communication devices 202 may retain a prior version of their individual lists and settings that existed before they joined the user group 120. As a result, when a communication device 202 leaves the user group 120, the communication device 202 may no longer have access to the shared group lists and settings and their lists may revert back to the individual state that the communication device maintained prior to joining the user group 120.

Figure 2:
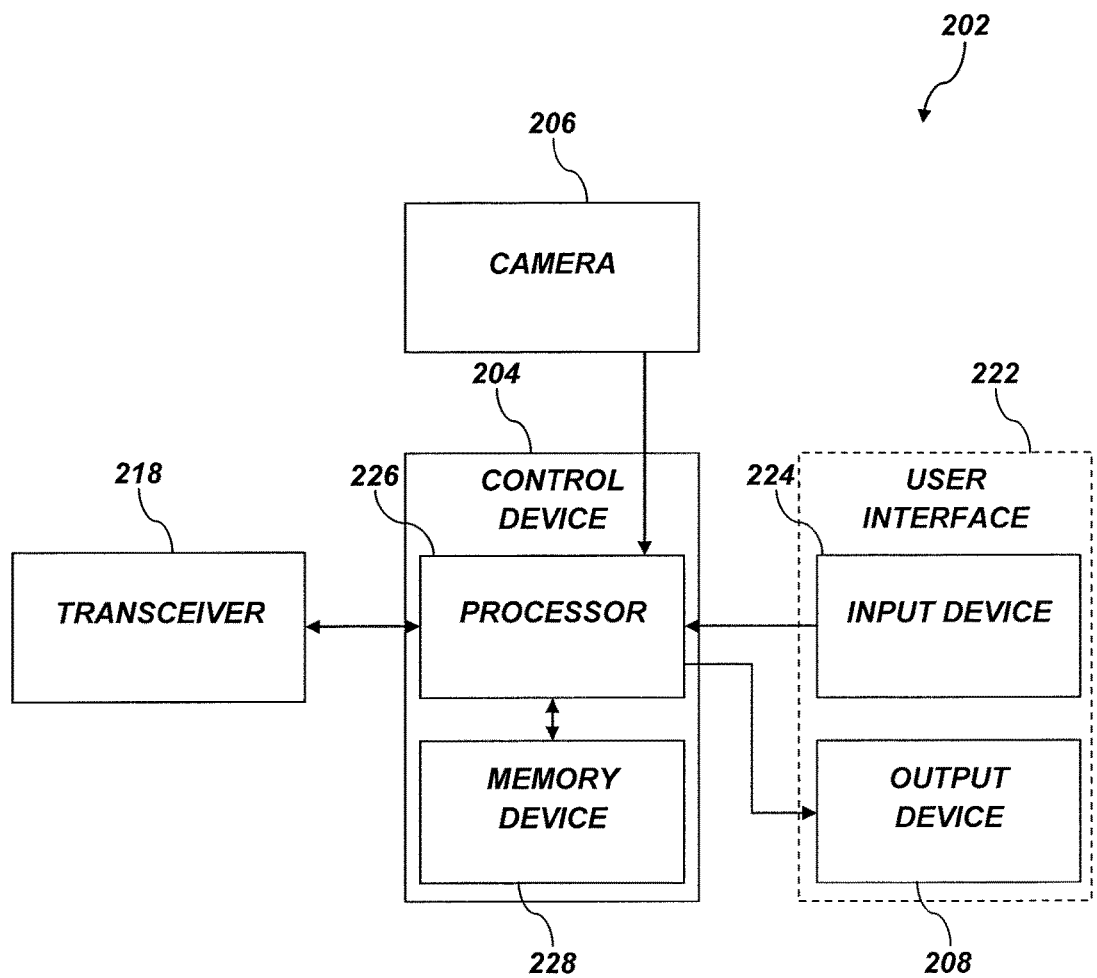
FIG. 2 is a simplified block diagram of a communication device according to some embodiments of the present disclosure.

FIG. 2 is a simplified block diagram of a computing device. The computing device may be a communication device 202 according to some embodiments of the present disclosure. The computing device may also be a server 112 according to some embodiments of the present disclosure. The computing device, whether a server 112 or a communication device 202 will be referred to in the description of FIG. 2 as a communication device. The communication device 202 may be one of the communication devices 202 shown in FIG. 1. The communication device 202 may include a control device 204 operably coupled to a camera 206, a transceiver 210, and a user interface 222. The control device 204 may include at least a processor 226 and a memory device 228. The processor 226 may be configured to execute commands stored on the memory device 228. By way of non-limiting example, the memory device 228 may include a computer readable media, such as, read only memory (ROM), random access memory (RAM), flash memory, and combinations thereof. The control device may be configured to control the camera 206, and the user interface 222. In addition, the control device may be configured to cause the transceiver 210 to transmit and receive data through the networks 110.

The camera 206 may include devices capable of capturing and converting visual images to data, as will be readily apparent to those skilled in the art. By way of non-limiting example, the camera may include a webcam, a camcorder device, a camera device integrated into the same enclosure as the control device 204, and other suitable devices. The camera 206 may be operably coupled to the control device 204 and configured to deliver the data to the control device 204.

The user interface 222 may include an input device 224 and an output device 208 operably coupled to the control device 204. By way of non-limiting example, the input device 224 may include a keyboard, a numerical keypad, a mouse, a touch-screen, a button array, a track pad, a remote control, motion sensors, orientation sensors, position sensors, a microphone, and combinations thereof. The input device 224 may be configured to receive commands from the user. Also by way of non-limiting example, the output device 208 may include any of a light-emitting diode (LED) array, a segmented display, a liquid crystal display, a cathode ray tube display, a plasma display, and other electronic displays. The output device 208 may also include other peripheral output devices, such as speakers and vibrators. In some embodiments, the input device 224 and the output device 208 may be integrated in the same device, such as, for example, a touch-screen display. In other embodiments, the input device 224 and the output device 208 may be implemented in separate devices, such as a keyboard and an LCD monitor, respectively.

The control device 204 may cause the output device 208 to display video images received as data at the transceiver 210 during a video call. The control device 204 may also cause the output device 208 to display options on the output device 208, such as through a graphical user interface displayed on the output device 208. In addition, the control device 204 may execute user commands received by the input device 224.

The user interface 222 may enable the user of the communication device 202 to take several types of actions. Some of these actions may include logging in to the communication device 202 as a specific user, creating a new user group 120, inviting another communication device 202 to join a user group 120, withdrawing a communication device 202 from the user group 120, place a video call to another communication device 202, accept an incoming call from another communication device 202, access account information associated with the communication device 202, access account information associated with a user group 120 with which the communication device 202 is associated, etc.

Figure 3A:
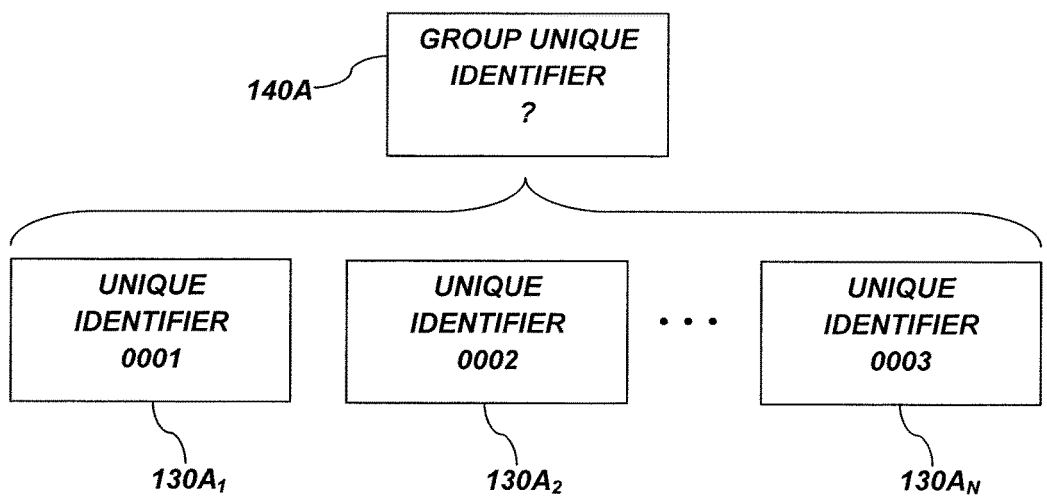
FIGS. 3A and 3B illustrate a method for assigning a group unique identifier to a user group according to an embodiment of the present disclosure.
Figure 3B:
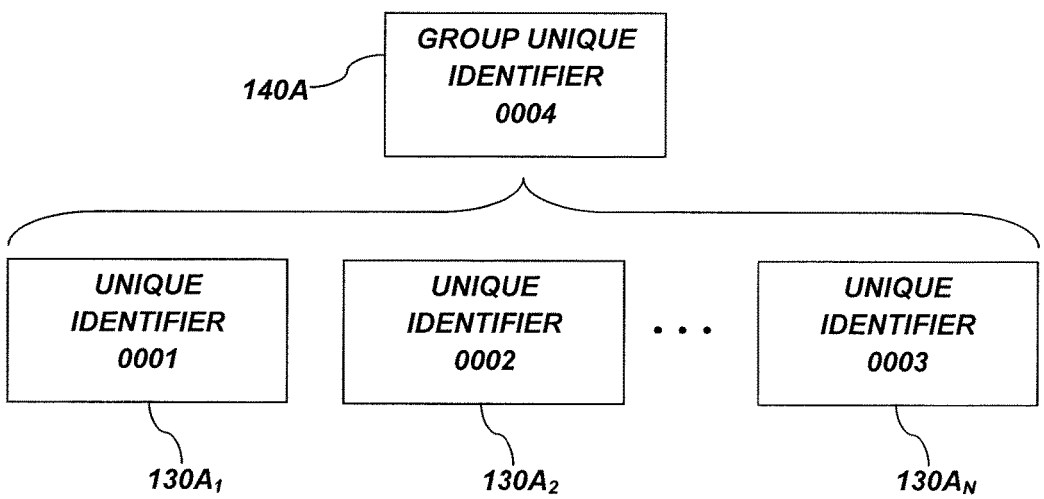

FIGS. 3A and 3B illustrate a method for assigning a group unique identifier 140 to a user group 120 according to an embodiment of the present disclosure. In particular, the first group 120A (FIG. 1) may receive a group unique identifier 140A to be associated with each of the communication devices 202 (FIG. 1) that are members of the first group 120A. As depicted in FIGS. 3A and 3B, the group unique identifier 140A may be a completely new identifier that was not previously an individual unique identifier $130A_1$, $130A_2$, $130A_N$ that is associated with one of the communication of the first user group 120A.

For example, the first user may decide to group together a plurality of communication devices 202, wherein each of the plurality of communication devices 202 have already been assigned their own individual unique identifiers 130. For example, the first communication device $202A_1$ is associated with the first individual unique identifier $130A_1$ of "0001," the second communication device $202A_2$ is associated with the second individual unique identifier $130A_2$ of "0002," and the Nth communication device $202A_N$ is associated with the Nth individual unique identifier $130A_N$ of "0003."

As depicted in FIG. 3A, when the first user group 120A is created, the group unique identifier 140A may be unassigned. As depicted in FIG. 3B, the first user group 120A may be assigned a new group unique identifier 140A that was not previously assigned to any communication device 202 of the newly formed user group 120A. In other words, when the first user group 120A is created, the first user group 120A may be initialized with a new individual unique identifier $130A_1$ assigned thereto. For example, the group unique identifier 140A assigned to the user group 120A is "0004." The four digit unique identifiers 130, 140 are illustrated as a simple example of a unique identifier. As discussed above, the unique identifiers 130, 140 may be a telephone number, IP address, or other suitable identifier.

Figure 4A:
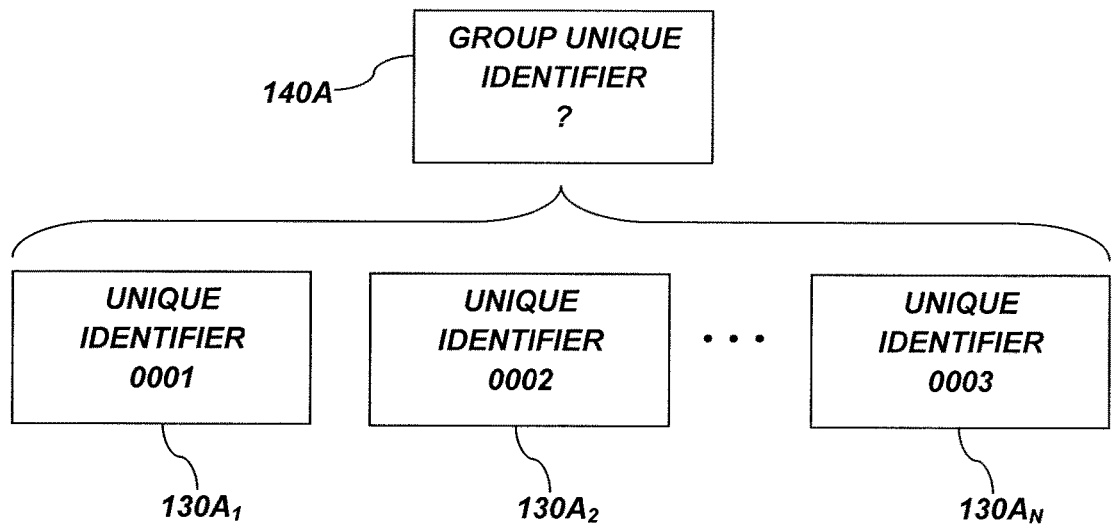
FIGS. 4A and 4B illustrate a method for assigning a group unique identifier to a user group according to another embodiment of the present disclosure.
Figure 4B:
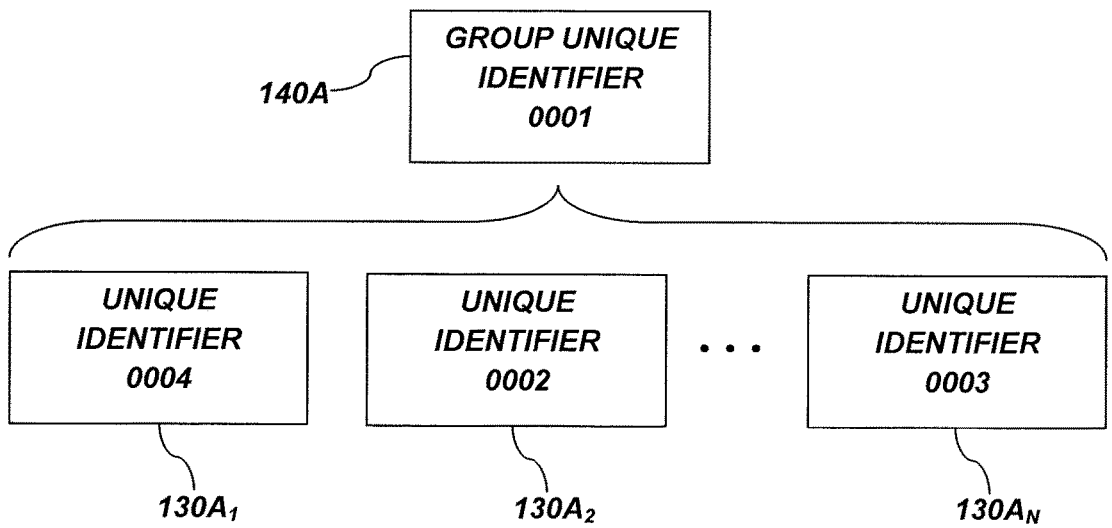

FIGS. 4A and 4B illustrate a method for assigning a group unique identifier 140 to a user group 120 according to another embodiment of the present disclosure. In particular, the first group 120A (FIG. 1) may receive a group unique identifier 140A to be associated with each of the communication devices 202 (FIG. 1) that are members of the first group 120A. As depicted in FIGS. 4A and 4B, the group unique identifier 140A may be a selected from an existing individual unique identifier 130A that was previously an individual unique identifier $130A_1$, $130A_2$, $130A_N$ that is associated with one of the communication of the first user group 120A.

For example, in some embodiments, the group unique identifier 140A assigned to the user group 120A may be selected from among the individual unique identifiers $130A_1$, $130A_2$, . . . $130A_N$ that are part of the user group 120A. For example, the individual unique identifier $130A_1$ of the first communication device $202A_1$ may be "promoted" to be the group unique identifier 140A for the first user group 120A. As a result, the individual unique identifier $130A_1$ ("0001") previously associated with the first communication device $202A_1$ may be "sacrificed" and becomes the unique identifier 140A for the first user group 120A. In some embodiments, another individual unique identifier $130A_1$ ("0004") may be assigned to the first communication device $202A_1$ so that the first communication device $202A_1$ may remain associated with both the individual unique identifier $130A_1$ and the group unique identifier 140A associated with the first user group 120A.

When a user group 120 is established, the information (contacts, blocked calls, etc.) associated with the individual communication devices 202 may become group information (i.e., accessible through the other communication devices 202 of the user group 120), as desired by the user. In some embodiments involving a user group 120 initiated through promotion of an existing individual unique identifier 130 to become the group unique identifier 140 associated with the user group 120, only the information for that individual communication device 202 (e.g., communication device 202A₁) may be promoted to be group information.

Even though the establishment of the user group 120A is described with reference to FIGS. 3A, 3B, 4A, and 4B in terms of assigning the group unique identifier 140A to a newly established user group 120A, similar methods may be used to change the group unique identifier 140 after the user group 120 has been established. Therefore, the group unique identifier 140 assigned to the user group 120 may be changed by assigning a completely new group unique identifier 140 to the user group 120. In addition, the group unique identifier 140 may be changed by promoting one of the individual unique identifiers 130 to be the new group unique identifier 140 assigned to the user group 120, which may cause that a new individual unique identifier 130 be assigned to the corresponding communication device 202. In addition, the group unique identifier 140 associated with the user group 120 may be "demoted." In other words, the group unique identifier 140 assigned to the user group 120 may once again become associated with a corresponding first communication device 202, and a new group unique identifier 140 may be assigned (e.g., new issuance, promotion, etc.) to the user group 120, or the user group 120 may be dissolved.

Figure 5A:
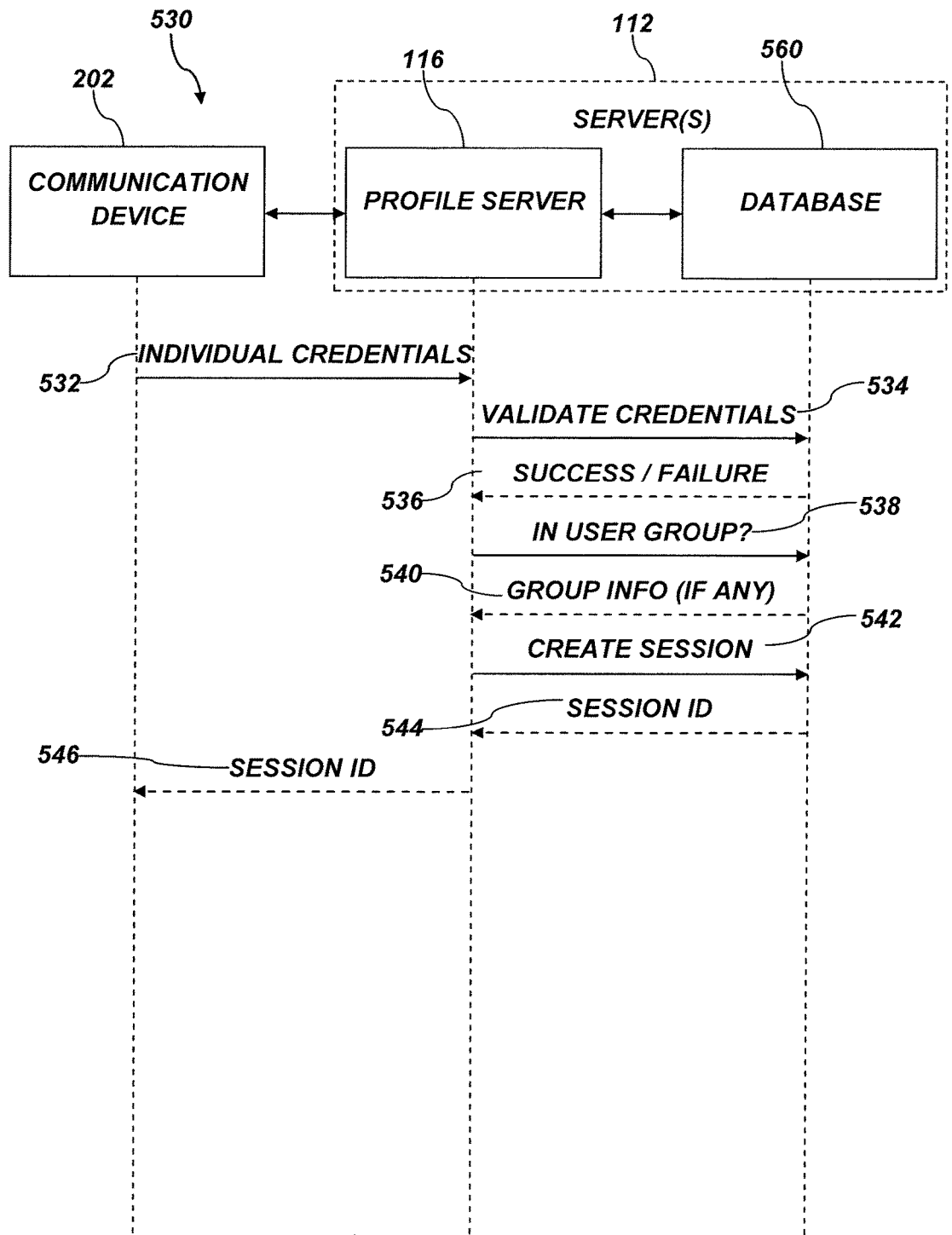
FIGS. 5A and 5B are data flow charts illustrating data flow between a communication device, a profile server, and a database associated with the profile server.
Figure 5B:
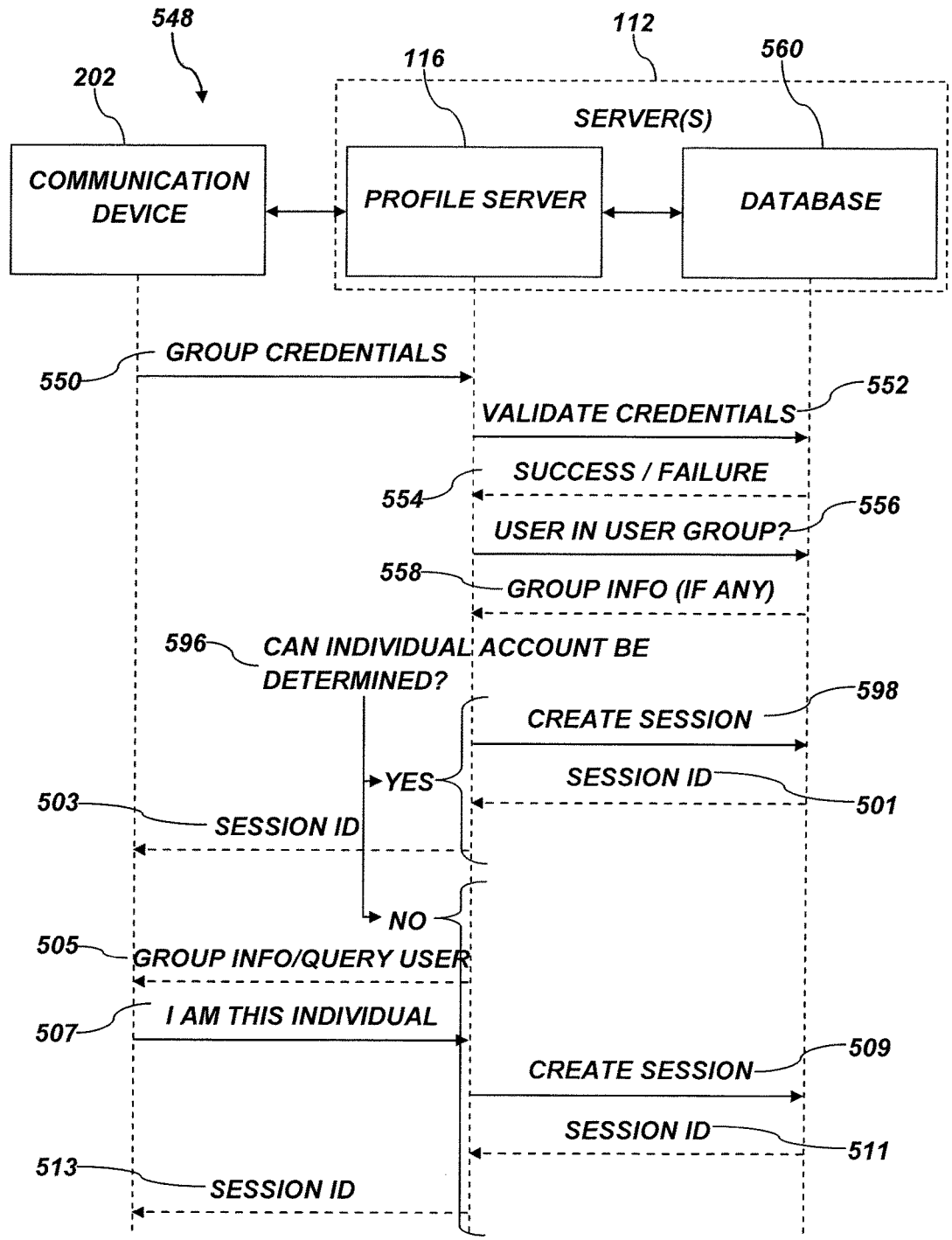

FIGS. 5A and 5B are data flow charts 530, 548 illustrating data flow between a communication device 202, a profile server 116, and a database 560 associated with the profile server 116. FIG. 5A illustrates data flow resulting from communication device 202 logging in with individual credentials associated with the communication device to access account information. FIG. 5B illustrates data flow resulting from the communication device 202 logging in with group credentials associated with a user group 120 to access account information, the communication device 202 belonging to the user group 120.

The database 560 may be configured to store individual account information corresponding to the communication device 202 and group account information corresponding to a user group 120 (FIG. 1) to which the communication device 202 belongs. Individual account information may include valid individual log in credentials (also referred to herein as "individual credentials"), user information, and individual communication device 202 information associated with the communication device 202. Group account information may include valid group log in credentials (also referred to herein as "group credentials"), user information, and group information associated with the user group. The group account information may also include information corresponding to a plurality of communication devices 202 that belong to the user group 120.

Referring to FIG. 5A, the user of the communication device 202 may provide individual credentials through the user interface 222 (FIG. 2) of the communication device 202. By way of non-limiting example, the individual credentials may be a user name and password. In some embodiments, the user name may be the individual unique identifier 130 assigned to the communication device 202. Other individual credentials, such as for example a user selected user name, are also contemplated.

At operation 532, the communication device 202 may send the individual credentials through the networks 110 (FIG. 1) to the profile server 116. At operation 534, the profile server 116 may send a validation request to the database 560 to validate the individual credentials provided by the user against the valid individual credentials stored in the database 560.

At operation 536, the database 560 may send a success/failure signal to the profile server 116 indicating either success or failure of the log in attempted by the user of the communication device 202. If the individual credentials provided by the user of the communication device 202 do not match those stored in the database 560, then the success/failure signal sent to the profile server 116 may indicate failure of the log in attempt. As a result, the user may not be given access to account information. If, on the other hand, the log in credentials provided by the user of the communication device 202 match those stored on the database 560, the success/failure signal sent to the profile server 116 may indicate a successful log in attempt. As a result, the user may be given access to the individual account information.

In some embodiments, the profile server 116 may also cause the communication device to give the user access to the group account information along with the individual account information if the communication device 202 belongs to the user group 120. If, however, the communication device 202 is not associated with the user group 120, then the profile server 116 may cause the communication device 202 to only access the individual account information. In other embodiments, logging in with the individual credentials may exclude the communication device 202 from accessing the group account information regardless of whether the communication device 202 belongs to the user group.

If the log in attempt succeeds, at operation 538 the profile server 116 may query the database 560 to determine whether the communication device 202 belongs to a user group 120. At operation 540, the database 560 may send the group account information to the profile server 116 if the communication device 202 is part of the user group 120. If, on the other hand, the communication device 202 is not part of the user group 120, the database 560 may only send the individual account information, and not the group account information.

The profile server 116 may create a session and cause a session identifier to be stored on the database 560 at operation 542. At operation 544, the database may send the session identifier to the profile server 116. At operation 546, the profile server 116 may send the session identifier through the networks 110 to the communication device 202, and the user may operate the communication device 202 as both the communication device 202 and the user group 120 if the communication device 202 belongs to the user group 120, and only as the communication device 202 if the communication device 202 does not belong to the user group 120.

Referring to FIG. 5B, the user of the communication device 202 may provide group credentials through the user interface 222 (FIG. 2) of the communication device 202. The group credentials may include a user name and password. In some embodiments, the user name may be the group unique identifier 140 assigned to the communication device 202. Other group credentials, such as for example a user selected username, are also contemplated.

At operation 550, the communication device 202 may send the group credentials through the networks 110 (FIG. 1) to the profile server 116. At operation 552, the profile server 116 may send a validation request to the database 560 to validate the group credentials provided by the user against the valid group credentials stored in the database 560.

At operation 554, the database 560 may send a success/failure signal to the profile server 116 indicating either success or failure of the log in attempted by the user of the communication device 202. If the group credentials provided by the user of the communication device 202 do not match those stored in the database 560, then the success/failure signal sent to the profile server 116 may indicate failure of the log in attempt. As a result, the user may not be given access to account information. If, on the other hand, the group credentials provided by the user of the communication device 202 match those stored on the database 560, the success/failure signal sent to the profile server 116 may indicate a successful log in attempt. As a result, the user may be given access to the group account information.

If the log in attempt succeeds, at operation 556 the profile server 116 may query the database 560 to determine whether the communication device 202 belongs to a user group 120. At operation 558, the database 560 may send the group account information to the profile server 116 if the communication device 202 is part of the user group 120. If, on the other hand, the communication device 202 is not part of the user group 120, the database 560 may not send the group account information.

Once the user succeeds in logging in with group credentials, at operation 596 the profile server 116 may attempt to determine which individual account information to give the communication device 202 access to along with the group account information. If the profile server 116 succeeds in determining which individual account information to provide, the profile server 116 may create a session and cause a session identifier to be stored on the database 560 at operation 598. At operation 501, the database may send the session identifier to the profile server 116. At operation 503, the profile server 116 may send the session identifier through the networks 110 to the communication device 202, and the user may operate the communication device 202 as both the communication device 202 and the user group 120.

Returning to operation 596, if the profile server cannot determine which individual account information to provide to the user, at operation 505 the profile server may send the group account information to the communication device 202 and query the user to indicate which individual account information to provide. At operation 507, the user may indicate the individual account information that should be provided, and the indication may be sent to the profile server 116. At operation 509, the profile server may create a session, and cause a session identifier to be stored in the database 560. The database 560 may send the session identifier to the profile server 116 at operation 511, and the profile server 116 may send the session identifier through the networks 110 to the communication device 202 at operation 513. The user may then operate the communication device 202 as both the communication device 202 and the user group 120. As a result, using a group unique identifier 140 to log in may also cause the communication device 202 to communicate with the one or more servers 112 responsive to being addressed by the individual unique identifier 130 assigned to the communication device.

Figure 6:
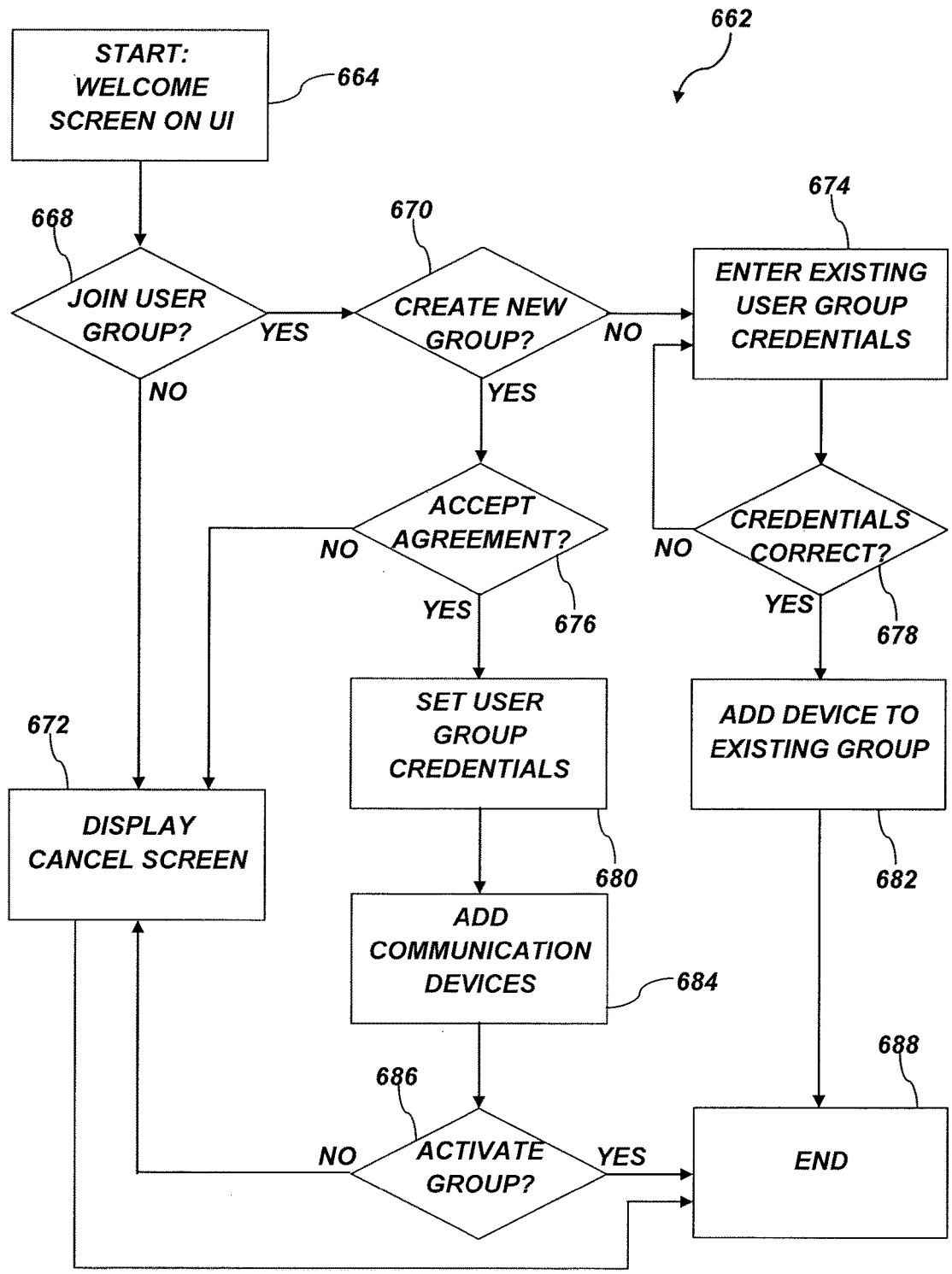
FIG. 6 is a flowchart of a method for adding a communication device to a new or existing user group.

FIG. 6 is a flowchart 662 of a method for adding a communication device 202 (FIGS. 1 and 2) to a new or existing user group 120. At operation 664, the user interface 222 (FIG. 2) may display a welcome screen to a user of the communication device 202. At operation 668, the user interface 222 may display an option to join a user group 120 (FIG. 1). If the user rejects the option to join a user group 120, at operation 672 the user interface 222 may display a cancel screen, and at operation 688 the method may end. If the user accepts the option to join a user group 120, at operation 670 the user interface 222 may provide an option to create a new user group 120.

If the option to create a new user group 120 is accepted, at operation 676 the user interface 222 may display an agreement delineating any terms required for creating the new user group 120, and an opportunity is provided to accept or reject the agreement. If the agreement is rejected, at operation 672 the user interface 222 may display the cancel screen, and at operation 688 the method may end. If, on the other hand, the agreement is accepted, at operation 680 the user interface 222 may prompt the user to set group credentials, including, for example, a group unique identifier 140 (FIG. 1) and a password. At operation 684 the user interface 222 may prompt the user to add other communication devices 202 to the new user group 120. The profile server 116 (FIG. 2) may send invitations to join the new user group 120 to any communication devices 202 added by the user. At operation 686, the user interface 222 may provide the user an option to activate the new user group 120. If the user elects to activate the new user group 120, the new user group 120 may be activated, and at operation 688 the method may end. If the user elects not to activate the new user group 120, at operation 672 the cancel screen may be displayed, and at operation 688, the method may end.

Going back to operation 670, if the option to create a new user group 120 is denied, the user interface 222 may prompt the user to enter existing user group 120 credentials at operation 674. At operation 678, if the credentials are not correct, the user interface 222 may once again prompt the user to enter existing user group 120 credentials at operation 674. At operation 678, if the credentials are correct, the communication device 202 may be added to the existing user group 120 at operation 682. At operation 688 the method may end.

Figure 7A:
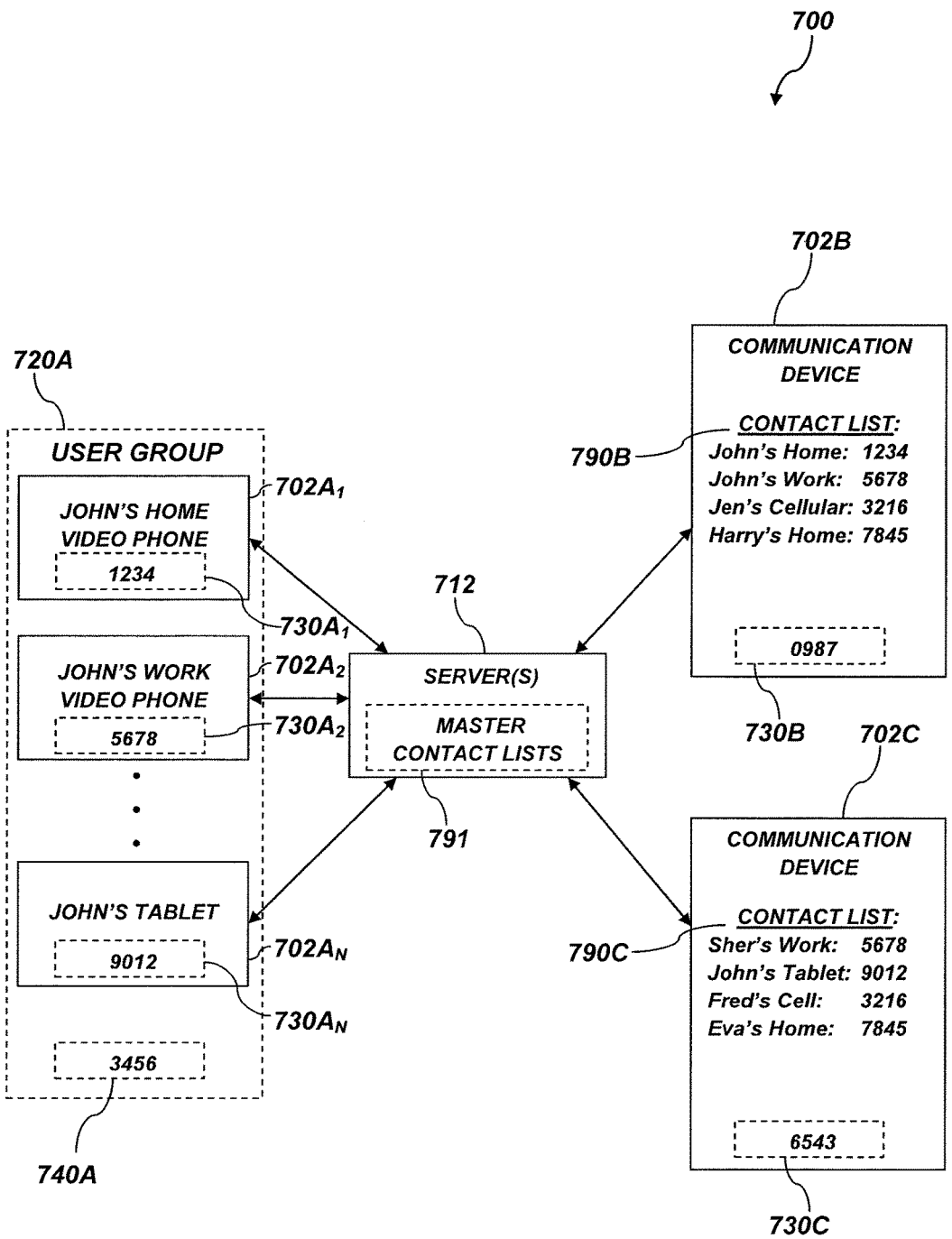
FIGS. 7A through 7C illustrate a communication system and a method of automatically changing an entry in one or more remote contact lists associated with one or more communication devices.
Figure 7B:
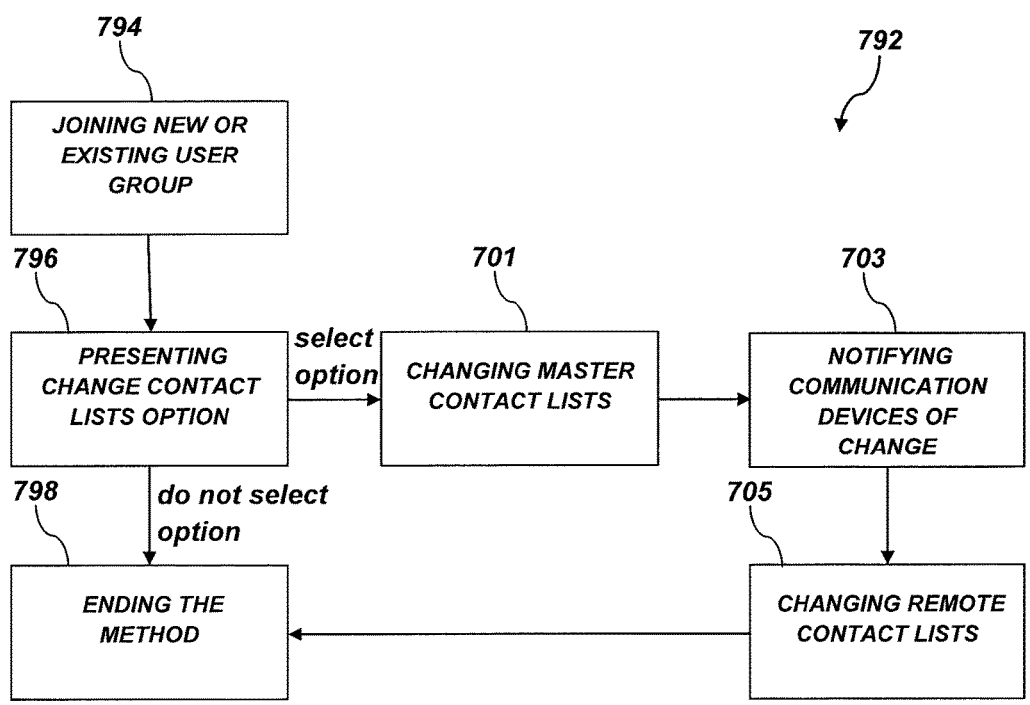
Figure 7C:
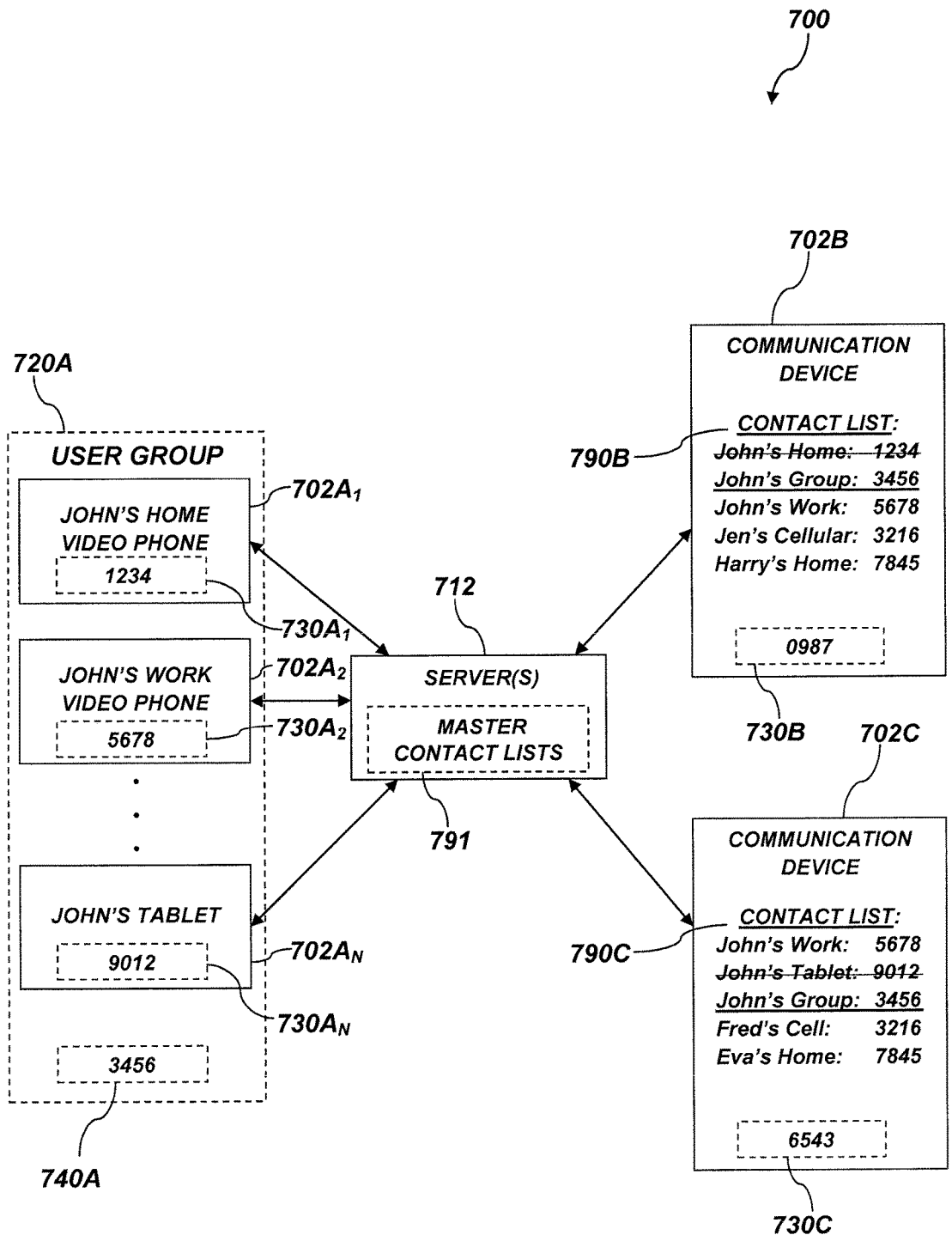

FIGS. 7A through 7C illustrate a communication system 700 and a method of automatically changing an entry in one or more remote contact lists 790 associated with one or more communication devices 702. FIGS. 7A and 7C are simplified block diagrams of a communication system 700 similar to the communication system 100 of FIG. 1. The communication system 700 includes a plurality of communication devices $702A_1$, $702A_2$, ... $702A_N$, 702B, 702C (sometimes referred to herein collectively and individually as "communication devices 702" and "communication device 702," respectively) similar to the communication devices 202 of FIGS. 1 and 2. The communication system 700 may also include one or more servers 712 (referred to sometimes herein as "servers 712") similar to the one or more servers 112 of FIG. 1.

Referring to FIG. 7A, each of the communication devices 702 may be configured to communicate with the servers 712 responsive to being addressed by the servers 712 with an individual unique identifier 730 assigned to each communication device 702. By way of non-limiting example, communication devices $702A_1$, $702A_2$, ... $702A_N$, 702B, 702C may be assigned respective individual unique identifiers $720A_1$, $720A_2$, ... $720A_N$, 720B, 720C.

Each of the communication devices 702 may also be configured to join a new or existing user group 720 (for more detail, see FIG. 6). If a communication device 702 belongs to a user group 720, it may communicate with the servers 712 responsive to being addressed by the servers 712 with a group unique identifier 740 assigned to the user group 720. By way of non-limiting example, communication devices $702A_1$, $702A_2$, ... $702A_N$ of FIG. 7A belong to user group 720A, which is assigned a group unique identifier 740A of "3456." Communication devices 702B and 702C may or may not belong to any user group 720. Also by way of non-limiting example, communication devices $702A_1$, $702A_2$, ... $702A_N$ may be John's home video phone, John's work video phone, and John's tablet computer, respectively.

Each of the communication devices 702 may include a memory device 228 (FIG. 2) configured to store a remote contact list 790 (only communication devices 702B and 702C show remote contact lists 790 [790B and 790C], however it should be understood that each communication device 702 may store a remote contact list 790). Each remote contact list 790 may include a list of entries of individual unique identifiers 730, group unique identifiers 740, or a combination thereof. Each contact list 790 may optionally also include a description of each communication device 702 and/or user group 720 listed in the remote contact list 790. By way of non-limiting example, the description may include information indicating a user, a location, a nature of the communication device, and combinations thereof. Each remote contact list 790 may enable a user of the corresponding communication device 702 to initiate a call to the communication devices 702 represented in the remote contact list without memorizing or looking up the individual unique identifiers 730 and/or group unique identifiers 740 assigned thereto. In some embodiments, the remote contact list 790 enable a user to initiate a call to another communication device 702 by selecting a contact entry from the remote contact list 790.

The servers 712 may include a database 560 (FIG. 5) configured to store a master contact list 791 for each communication device 720 in the communication system 700. Generally, the master contact lists 791 may be the same as the remote contact lists 790 stored on the communication devices 702.

FIG. 7B is a flowchart 792 of a method of automatically changing an entry in one or more remote contact lists 790. As discussed in more detail with respect to FIG. 6, each communication device 702 may be configured to join a new or existing user group 720. Referring to FIGS. 7A and 7B, a communication device 702 may join a new or existing user group 720 at operation 794. A user interface 222 (FIG. 2) of the communication device 702 may present a change contact lists option to a user at operation 796. The term "present," and derivations such as "presenting," "presented," "presentation," etc. may refer to a variety of different actions. As previously discussed with respect to FIG. 2, the user interface 222 may include an output device, which may take a variety of forms. For example, the output device may be a screen display including any of a light-emitting diode (LED) array, a segmented display, a liquid crystal display, a cathode ray tube display, a plasma display, and other electronic displays. The output device 208 may also include other peripheral output devices, such as speakers and vibrators. In some embodiments, the output device may be integrated with an input device as the same device, such as, for example, a touch-screen display. In other embodiments, the output device and the input device may be implemented as separate devices, such as an LCD monitor and keyboard, respectively. As the output device of the user interface 222 may take a variety of forms, it should be understood that the term "present" may embody any of a variety of forms.

If a user of the communication device 702 does not select the change contact lists option, the method may end at operation 798. The term "select," and other derivations of the root word "select," such as "selecting," "selected," "selection," etc., may refer to selecting an option presented by the user interface 222. As previously discussed with respect to the user interface 222 of FIG. 2, the user interface 222 may include an input device, which can take various forms. By way of non-limiting example, the input device may include a keyboard, a numerical keypad, a mouse, a touch-screen, a button array, a track pad, a remote control, motion sensors, orientation sensors, position sensors, a microphone, and combinations thereof. As the input device of the user interface 222 may take any of a variety of forms, "select" may embody any of a variety of actions including, but not limited to, clicking on an option presented on a screen with a mouse, touching an option presented on a touch-screen interface, pressing a button on a button array that corresponds to an option being presented by the user interface 222, speaking an option into a microphone, and etc.

Returning to operation 796, if the user selects the change contact lists option, the communication device 702 may cause the one or more servers to change one or more of the master contact lists 791 at operation 701. More specifically, the server may replace contact entries corresponding to the communication device 702 in the master contact lists 791 associated with the other communication devices 702 with contact entries corresponding to the new or existing user group 720 joined by the communication device 702.

The servers 712 may notify the other communication devices 702 that a change occurred in the master contact lists 791 associated with the other communication devices 702 at operation 703. The other communication devices 702 may change the remote contact lists 790 stored on the other communication devices 702 to reflect the changes made to the corresponding master contact lists 791. For example, the entries in the remote contact lists 790 that include contact entries corresponding to the communication device 702 may be replaced with contact entries corresponding to the new or existing user group 720. The method may end at operation 798.

In some embodiments, the servers 712 may not store the master contact lists 791, and operation 701 may be eliminated from the method. In such embodiments, the servers 712 may notify the other communication devices 702 of the changes responsive to the user selecting the change contact lists option. The remote contact lists 790 may then be changed as previously described.

As a result of the changes in the remote contact lists 790, each of the communication devices 702 belonging to the new or existing user group 720 may indicate an incoming call responsive to the users of the other communication devices 702 selecting the contact entries corresponding to the new or existing user group 720. There may, therefore, be certain instances where a user of a communication device 702 may not want to select the change contact lists options.

In some embodiments, a user of another communication device 702 that experienced a changed remote contact list may not be notified of the change to the remote contact list. In other embodiments, a user interface of the other communication may present a changed remote contact list notification to the user of the other communication device.

By way of non-limiting example, FIG. 7C is the simplified block diagram of FIG. 7A after certain selections of the change contact lists option have been made on communication devices $702A_1$ and $702A_N$. The simplified block diagram of FIG. 7C may be similar to the simplified block diagram of FIG. 7A, except that changes are shown on the remote contact lists 790B and 790C corresponding to communication devices 702B and 702C, respectively. The changes are indicated with strikethrough text and underlined text, where strikethrough indicates deletion and underlining indicates insertion.

A user, John, of the communication devices 702A₁, 702A₂, ... 702A_N belonging to user group 740A may not, for example, desire his home video phone 702A₁ or his tablet computer 702A_N to indicate an incoming call when other communication devices 702B and 702C place a call to his work video phone 702A₂. John may, therefore, not desire the "John's Work: 5678" entry in remote contact list 790B to be replaced with the "John's Group: 3456" entry, and may not select the change contact lists option at operation 796 of FIG. 7B for his work video phone A₂.

John may also, for example, frequently find himself away from his home video phone 702A₁ and his tablet computer 702A_N. Consequently, John may desire to cause the "John's Home: 1234" and the "John's Tablet: 9012" entries in remote contact lists 790B and 790C to be replaced with the "John's Group: 3456" entry, as illustrated in FIG. 7C. Therefore, John may desire to select the change contact lists option at operation 796 of FIG. 7B.

It should be noted that, as discussed with respect to FIGS. 4A and 4B, an individual unique identifier 730 may be promoted to become the group unique identifier 740. In embodiments involving promotion of an individual unique identifier 730 to a group unique identifier 740, the communication device 720 whose individual unique identifier 730 was promoted need not be presented the change contact lists option, as the individual unique identifier 730 of the communication device 702 before the promotion is the same as the group unique identifier 740 after the promotion.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A video communication device for use by a hearing-impaired user, the video communication device comprising:
    an electronic display; and
    a processor operably coupled with the electronic display, the processor configured to:
        associate an individual unique identifier with the video communication device that is unique to the video communication device such that incoming video calls cause only the video communication device to receive the incoming video call responsive to the incoming call being placed to the individual unique identifier;
        associate a group unique identifier with a user's device group that includes the video communication device and at least one additional video communication device associated with the same hearing-impaired user and having its own individual unique identifier such that incoming video calls placed to the group unique identifier from a non-member of the user's device group cause each video communication device of the user's device group to receive the incoming video call from a non-member of the user's device group responsive to being placed to the group unique identifier;
        generate a user interface on the electronic display, the user interface configured to:
            after the user's device group has already been established, change the group unique identifier for the user's device group by selecting one of the individual unique identifiers associated with the video communication devices of the user's device group to promote to become the group unique identifier for future incoming calls to the user's device group;
            change a first contact entry including a first individual unique identifier associated with a first video communication device of the user's device group with the group unique identifier; and
            change a second contact entry including a second individual unique identifier associated with a second video communication device of the user's device group with the user's device group with the group unique identifier; and
        automatically send the changes of the group unique identifier, the first contact entry, and the second contact entry to a remote server responsive to the change contact input thereby causing the remote server to cause the promoted individual unique identifier to be associated with the other video communication devices of the user's device group as the group unique identifier, and to update a remote contact list for a user account managed by the remote server for each remote video communication device that currently has the first contact entry and/or the second contact entry corresponding to the video communication devices stored in its remote contact list on its memory device to replace the first contact entry and/or the second contact entry with the group unique identifier in its remote contact list while leaving the third contact entry unchanged in any remote contact lists, wherein at least one remote communication device having the first contact entry is associated with a different user than the first user.

2. The video communication device of claim 1, further comprising a memory device operably coupled with the processor, and configured to store a local contact list including one or more contact entries corresponding to one or more other video communication devices.

3. The video communication device of claim 2, wherein the processor is further configured to automatically replace a fourth contact entry on the local contact list corresponding to a fourth video communication device with updated contact information for calling the fourth video communication device responsive to another hearing-impaired user of the fourth video communication device inputting the updated desired contact information into the fourth video communication device, wherein the fourth video communication device is a non-member of the user's device group.

4. The video communication device of claim 3, wherein:
    the user interface is configured to present the local contact list to the user; and
    the processor is further configured to initiate a video call to the fourth video communication device responsive to the user selecting the fourth contact entry in its local contact list using the updated contact information corresponding to the fourth video communication device.

5. The video communication device of claim 4, wherein:
    original contact information for the fourth contact entry prior to being updated was the fourth individual unique number for calling only the fourth video communication device;

the updated contact information for calling the fourth video communication device is another user's device group unique identifier for another user's device group that includes the fourth video communication device; and the processor is configured to initiate the video call to the another user's device group that includes the second video communication device and at least one additional video communication device responsive to the user selecting the second contact entry using the updated contact information corresponding to the another user's device group.

6. The video communication device of claim 1, wherein the user interface is further configured to change the group unique identifier for the user's device group after the user's device group has already been established by demoting the group unique identifier to be one of the individual unique identifiers associated with the video communication devices of the user's device group and issue a new group unique identifier for the user's device group.

7. A method of managing a user's device group and updating a remote contact entry of a remote contact list within a video communication system for facilitating video communication sessions for hearing-impaired users, the method comprising:

assigning a first individual unique identifier to a first video communication device, a second individual unique identifier to a second video communication device, and a third individual unique identifier to a third video communication device, wherein each of the first individual unique identifier, the second individual unique identifier, and the third individual unique identifier are used for video calls being routed only to the respective video communication device to which it is assigned;

assigning a first group unique identifier to a user's device group of video communication devices that includes the first video communication device, the second video communication device, and the third video communication device, wherein the first group unique identifier is used for video calls being routed to all video communication devices of the user's device group associated with the same hearing-impaired user;

managing a contact database including a first contact entry for the first video communication device, a second contact entry for the second video communication device, and a third contact entry for the third communication device;

promoting a selected one of the first individual unique identifier, the second individual unique identifier, or the third individual unique identifier by a first hearing-impaired user through a user interface of the first video communication device to become the first group unique identifier after the user's device group has been established such that the promoted individual unique identifier is used for subsequent video calls being routed to all video communication devices of the user's device group associated with the same hearing-impaired user;

receiving a user input from the first hearing-impaired user through the user interface of the first video communication device indicating a desired change of the first contact entry and the second contact entry to replace the first individual unique identifier with the first group unique identifier within the first contact entry, and to replace the second individual unique identifier with the second group unique identifier within the second contact entry; and automatically replacing contact entries within each remote video communication device of the communication system that has the first individual unique identifier and/or the second individual unique identifier stored in its remote contact lists with the first group unique identifier responsive to the user selecting the change entries option after joining the user's device group, wherein the remote video communication devices are associated with different users than the first hearing-impaired user.

8. The method of claim 7, wherein automatically replacing contact entries within each remote video communication device of the communication system comprises first replacing the first contact entry and the second contact entry in a master contact entry in a master contact list in the database managed by one or more servers that distributes the desired change of the first group unique identifier to each remote video communication device of the communication system that has the first individual unique identifier stored and/or the second individual unique identifier in its remote contact lists.

9. The method of claim 8, further comprising notifying the remote video communication devices of the change in the master contact list.

10. The method of claim 7, wherein automatically replacing contact entries within each remote video communication device of the communication system comprises automatically replacing the contact entries without notifying users of the remote video communication devices.

11. The method of claim 7, wherein automatically replacing contact entries within each remote video communication device of the communication system comprises notifying users of the remote video communication devices that the contact entries having the contact information corresponding to the first video communication device and/or the second video communication device have been replaced with the desired change for the contact entry.

12. A video communication system, comprising:
one or more servers configured to:
manage contact lists for a plurality of video communication devices;
assign a different individual unique identifier to each video communication device of the plurality of video communication devices including a first video communication device, a second video communication device, and a third video communication device associated with a first user, and remote video communication devices associated with different users;
route incoming calls placed to one of the different individual unique identifiers to only the respective video communication device to which it is assigned;
assign a group unique identifier to a user's device group of video communication devices including the first video communication device, the second video communication device, and the third video communication device all associated with the same first user, the group unique identifier for non-members of the user's device group to place a video call to each device of the entire user's device group instead of the devices individually;
route incoming calls placed to the group unique identifier from a non-member of the user's device group to each video communication device assigned to group user's device group;
promote a selected one of the different individual unique identifiers within the user's device group to be assigned as the new group unique identifier after the user's device group has been established for subsequent incoming calls;

route incoming calls placed to the new group unique identifier from a non-member of the user's device group to each video communication device assigned to group user's device group;

automatically replace at least some contact entries corresponding to the video communication devices of the user's device group from their respective individual unique identifier to the group unique identifier and distribute the changes to replace corresponding contact entries within remote contact lists in each remote video communication device of the communication system that has the corresponding individual identifier in its remote contact list for the contact entries of the user's device group that were changed responsive to the first user of the first video communication device changing the corresponding contact entries for the user's device group through the first video communication device after joining the user's device group.

13. The video communication system of claim 12, wherein the one or more servers are further configured to automatically replace the contact entry corresponding to the first video communication device from the first individual identifier to the group unique identifier for the contact entry within the remote contact lists by updating a master contact list stored in a database of the one or more servers.

14. The video communication system of claim 12, wherein the one or more servers are further configured to automatically replace the group unique identifier with a new individual unique identifier assigned to the first video communication device within the remote contacts lists.

15. The video communication system of claim 12, wherein the first individual unique identifier comprises a descriptive indicator including information indicating any information from the group consisting of a user, a location, and a nature of the first video communication device.

16. The video communication system of claim 12, wherein the one or more servers are configured to notify each remote video communication device of the communication system that has the first individual identifier in its remote contact list for the contact entry corresponding to the first video communication device that a change is to be made to its remote contact list.

17. The video communication system of claim 12, further comprising a video relay service configured to provide interpretive services for video calls placed between a hearing-impaired user using a video communication device and a hearing-capable user using another communication device.

18. The video communication system of claim 12, wherein the one or more servers is further configured to:

manage individual account information for each individual video communication device of the plurality of video communication devices;

manage group account information to be shared among the video communication devices of the user's device group; and promote the individual account information for the selected one of the individual unique identifiers within the user's device group to be the group account information for the user's device group.

19. The video communication system of claim 18, wherein the group account information includes group login credentials that provide access to a shared address book, a shared blocked caller list, a shared message history, shared text messages, shared video messages, and/or a shared call history for the different video communication devices of the user's device group.

20. A communication system including a video relay service for providing interpretive assistance to hearing-impaired users during a video communication session, the communication system comprising:

a plurality of video communication devices;

a profile server configured to:
  manage user accounts including at least one master contact list for hearing-impaired users of the plurality of video communication devices;
  assign an individual unique identifier to each video communication device of the plurality;
  assign a group unique identifier to each user's device group that include a group of video communication devices of the plurality that are associated with respective individual hearing-impaired user;
  promote a selected individual group identifier from within a user's device group after the user's device group has already been established to be the group unique identifier for the user's device group for subsequent incoming calls;
  communicate changes in the contact lists of the user accounts with the plurality of video communication devices by:
    receiving a first updated contact entry from a first video communication device associated with a first user account to replace a first individual unique identifier with a first group unique identifier within the first contact entry for the first video communication device;
    receiving a second updated contact entry from the first video communication device associated with the first user account to replace a second individual unique identifier with the first group unique identifier within the second contact entry for a second video communication device that is part of the same first user's device group as the first video communication device;
  update master contact lists maintained by the profile server for each of the other user accounts that have master contact lists that currently include the contact entry and/or the second contact entry associated with the first user account to be replaced by the updated contact entry, while maintaining contact entries associated with the first user's device group that were not changed by the first user; and
  transmit the updated contact entry to each of the video communication devices associated with the other user accounts that included master contact lists that currently include the first contact entry and/or the second contact entry for the first user account for the other video communication devices to replace the first contact entry and/or the second contact entry with the updated contact entry within their respective local contact lists; and a call routing server configured to:
  route an incoming call to an individual video communication device responsive to the incoming call being placed using one of the individual unique identifiers;
  route the incoming call to a group of video communication device associated with a user's device group responsive to the incoming call being placed using one of the group unique identifiers; and connect the incoming call to a translator for providing sign language translation services for the hearing-impaired user during an established communication session with a hearing-capable user.

\* \* \* \* \*